(12) United States Patent
Wang et al.

(10) Patent No.: US 11,303,215 B2
(45) Date of Patent: Apr. 12, 2022

(54) SYSTEM AND METHOD FOR PROVIDING A CONSTANT POWER SOURCE

(71) Applicant: Contemporary Amperex Technology Co., Limited, Ningde (CN)

(72) Inventors: Liansong Wang, Ningde (CN); Zhimin Dan, Ningde (CN); Yizhen Hou, Ningde (CN); Fangjie Zhou, Ningde (CN); Changjian Liu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/137,165

(22) Filed: Dec. 29, 2020

(65) Prior Publication Data

US 2021/0119547 A1   Apr. 22, 2021

Related U.S. Application Data

(63) Continuation of application No. PCT/CN2020/099281, filed on Jun. 30, 2020.

(30) Foreign Application Priority Data

Jul. 16, 2019  (CN) .......................... 201910641806.1

(51) Int. Cl.
*H02M 3/335* (2006.01)
*H02J 7/00* (2006.01)

(52) U.S. Cl.
CPC ....... *H02M 3/33576* (2013.01); *H02J 7/0063* (2013.01); *H02J 2207/10* (2020.01)

(58) Field of Classification Search
None
See application file for complete search history.

(56) References Cited

U.S. PATENT DOCUMENTS

2007/0210755 A1\* 9/2007 Gangstoe .............. H02J 7/0029
                                                                     320/128
2017/0361791 A1    12/2017 Yoon et al.
(Continued)

FOREIGN PATENT DOCUMENTS

CN       103522909 A    1/2014
CN       205543135 U    8/2016
(Continued)

OTHER PUBLICATIONS

International Search Report for PCT/CN2020/099281, dated Jun. 30, 2020, 10 pages.
(Continued)

*Primary Examiner* — Rexford N Barnie
*Assistant Examiner* — Terrence R Willoughby
(74) *Attorney, Agent, or Firm* — Law Offices of Liaoteng Wang (57) ABSTRACT

The present application discloses a system and method for providing a constant power source. The system includes: a main control module configured to receive a wake-up time and send the wake-up time to a timer device; a timer power supply module configured to supply power to the timer device according to electric energy in a high-voltage battery pack; a high-voltage power supply module configured to supply power to a power conversion module according to the electric energy in the high-voltage battery pack; the timer device configured to set a wake-up clock according to the wake-up time, start timing when a battery management system (BMS) enters into sleep, and send a discharge instruction to the high-voltage battery pack when the timing reaches the wake-up time; the power conversion module configured to convert high-voltage electric energy output from the high-voltage battery pack into low-voltage electric energy and supply power to the BMS.

20 Claims, 4 Drawing Sheets

(56) References Cited

U.S. PATENT DOCUMENTS

| | | | |
|---|---|---|---|
| 2018/0186316 A1 | 7/2018 | Harvey et al. | |
| 2019/0067961 A1* | 2/2019 | King | H02J 7/1446 |
| 2019/0319472 A1* | 10/2019 | Lebreux | H02H 3/08 |

FOREIGN PATENT DOCUMENTS

| | | |
|---|---|---|
| CN | 105978099 A | 9/2016 |
| CN | 103636108 B | 10/2016 |
| CN | 106080239 A | 11/2016 |
| CN | 106347154 A | 1/2017 |
| CN | 107985229 A | 5/2018 |
| CN | 109391136 A | 2/2019 |
| CN | 109421541 A | 3/2019 |
| CN | 109606118 A | 4/2019 |
| JP | 5439108 B2 | 3/2014 |

OTHER PUBLICATIONS

The extended European search report for EP Application No. 20824409.5, dated Sep. 6, 2021, 9 pages.
The First Office Action for China Application No. 201910641806.1, dated Sep. 1, 2021, 8 pages.

* cited by examiner

SYSTEM AND METHOD FOR PROVIDING A CONSTANT POWER SOURCE

CROSS REFERENCE TO RELATED APPLICATIONS

The present application is a continuation of International Application No. PCT/CN2020/099281, filed on Jun. 30, 2020, which claims priority to Chinese patent application No. 201910641806.1 filed on Jul. 16, 2019, both of which are incorporated herein by reference.

TECHNICAL FIELD

The present application relates the technical field of battery management, and in particular, to a system and method for providing a constant power source.

BACKGROUND

At present, in face of energy shortage and increasingly serious environmental pollution, it is imperative to develop pure electric new energy vehicles. New energy vehicles will become an important way to reduce vehicle exhaust emissions, reduce energy consumptions and relieve environmental pressures. A Battery Management System (Battery Management System, BMS) is an important part of energy management for a new energy vehicle, and it may realize intelligent management and maintenance of a power battery system of an electric vehicle.

Usually, a lead-acid battery of a vehicle may be used to provide a power source for the BMS. However, in a traditional power supply system, when the vehicle is not provided with the lead-acid battery and the BMS is in sleep, the BMS will stay in sleep and cannot be restarted, resulting in the BMS unable to monitor and handle status of a battery pack of the vehicle.

SUMMARY

Embodiments of the present application provide a system and method for providing a constant power source.

According to an aspect of the embodiments of the present application, there is provided a system for providing a constant power source, comprising a vehicle control module, a battery management system, a high-voltage battery pack, a timer power supply module, a timer device and a high-voltage power supply module, wherein the battery management system comprises a main control module and a power conversion module, and wherein the main control module is configured to send a wake-up time that is received to the timer device, the timer power supply module is configured to supply power to the timer device according to electric energy in the high-voltage battery pack, the high-voltage power supply module is configured to supply power to the power conversion module according to the electric energy in the high-voltage battery pack, the timer device is configured to set a wake-up clock according to the wake-up time, start timing when the battery management system enters into sleep, and send a discharge instruction to the high-voltage battery pack when the timing reaches the wake-up time, and the power conversion module is configured to convert high-voltage electric energy, which is output by the high-voltage battery pack according to the discharging instruction, into low-voltage electric energy and use the low-voltage electric energy to supply power to the battery management system.

According to another aspect of the embodiments of the present application, there is provided a method for providing a constant power source, comprising: receiving, by a main control module, a wake-up time and sending the wake-up time to a timer device; supplying, by a timer power supply module, power to the timer device according to electric energy in a high-voltage battery pack and supplying, by a high-voltage power supply module, power to a power conversion module according to the electric energy in the high-voltage battery pack; setting, by the timer device, a wake-up clock according to the wake-up time, starting timing when the battery management system enters into sleep, and sending a discharge instruction to the high-voltage battery pack when the timing reaches the wake-up time; converting, by the power-conversion module, high-voltage electric energy, which is output by the high-voltage battery pack according to the discharging instruction, into low-voltage electric energy and using the low-voltage electric energy to supply power to the battery management system.

BRIEF DESCRIPTION OF THE DRAWINGS

The drawings required to describe embodiments of the present application are introduced briefly below to illustrate technical solutions of the embodiments of the present application more clearly, and other drawings may be obtained by those ordinary skilled in the art from those drawings without any creative work.

DETAILED DESCRIPTION

Features and exemplary embodiments of various aspects of the present application will be described in detail below. In order to make the purpose, technical solutions, and advantages of the present application clearer, the present application is described in detail below with reference to the accompanying drawings and embodiments. It should be understood that specific embodiments described herein are merely intended to describe the present application, and are not intended to limit the present application. For those skilled in the art, the present application may be practiced without some of the specific details. The following description of the embodiments is only to provide a better understanding of the present application by illustrating examples of the present application.

It is to be noted that relational terms such as first, second and the like are used herein solely to distinguish one entity or operation from another entity or operation without necessarily requiring or implying any actual such relationship or order between such entities or operations. Moreover, the terms "include", "comprise" or any other variants thereof are intended to cover non-exclusive inclusion, so that a process, method, article or device including a series of elements not only includes those elements, but also includes those that are not explicitly listed or also include elements inherent to the process, method, article or equipment. In the case that there are no more limitations, an element defined by the phrase "including . . . " does not exclude the existence of other same elements in the process, method, article or equipment that includes the element.

Figure 1:
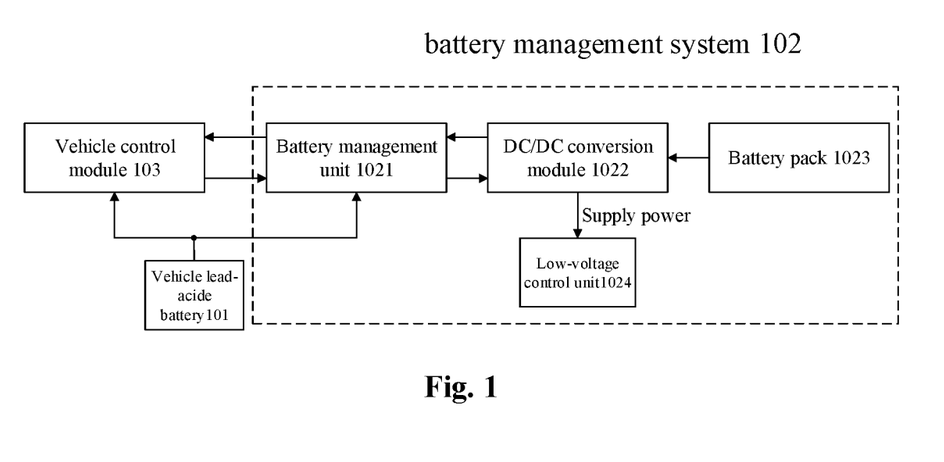
FIG. 1 is a schematic diagram showing a system structure in which a vehicle lead-acid battery supplies power to a battery management system according to an embodiment of the present application.

FIG. 1 is a schematic diagram showing a system structure in which a vehicle lead-acid battery supplies power to a battery management system according to an embodiment. As shown in FIG. 1, the vehicle lead-acid battery 101 may supply power to the battery management system 102. The battery management system 102 may include a battery management unit 1021, a direct current/direct current conversion (DC/DC) module 1022 and a battery pack 1023. The DC/DC module 1022 may perform DC voltage conversion, for example, convert a 24V system power source to a 12V system power source to supply power to an electrical equipment of a vehicle-mounted 12V system.

In a new energy vehicle, the vehicle lead-acid battery 101 may provide a power source for the battery management system 102, and may also be connected to a low-voltage control unit 1024 via a power supply bus to supply power to the low-voltage control unit 1024. The battery management system 102 may realize information interaction with a vehicle control module (Vehicle Control Unit, VCU) 103 via a CAN bus and upload information relevant to the State Of charge (State Of Charge, SOC), voltage, current and so on of the battery pack 1023 to the vehicle control module.

When the new energy vehicle is not provided with the vehicle lead-acid battery and is parked for a long time without being used, the vehicle control module and the battery management system are powered off. Since there is no vehicle lead-acid battery providing the power source, the BMS is in sleep and cannot monitor the SOC, voltage, current and so on of the battery pack of the new energy vehicle and handle it accordingly.

The embodiments of the present application provide a system and method for providing a constant power source to provide the power source for the battery management system, so that when the battery management system is in sleep, it is periodically awakened at a set time to ensure that the battery management system is in a powered state and facilitate the battery management system's collecting and storing information relevant to the battery pack of the vehicle. The system and method for providing the constant power source according to the embodiments of the present application may wake up the BMS without assistance of the vehicle lead-acid battery, thereby reducing the loss of lead-acid in the vehicle lead-acid battery and increasing the life of the vehicle lead-acid battery.

Figure 2:
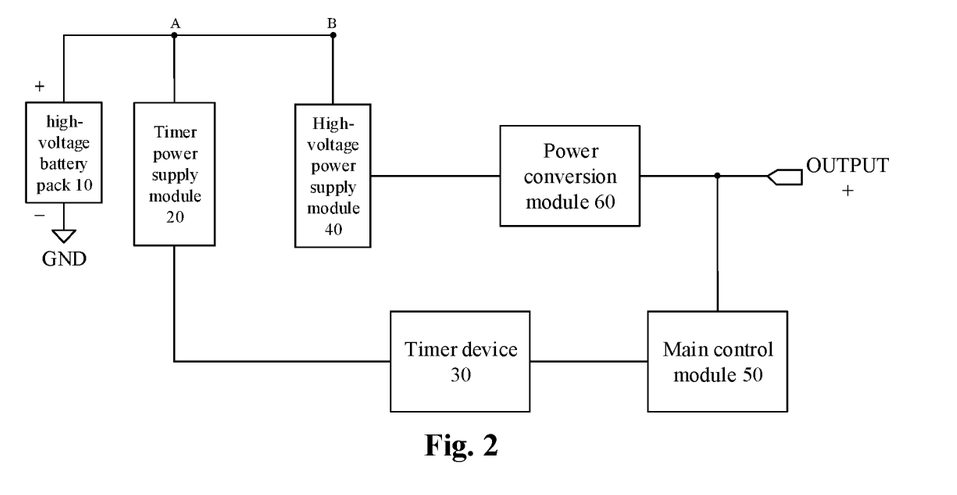
FIG. 2 is a structure diagram showing a system for providing a constant power source according to an embodiment of the present application.

FIG. 2 is a structure diagram showing a system for providing a constant power source according to an embodiment of the present application. As shown in FIG. 2, the system 200 for providing a constant power source according to the embodiment of the present application may include a battery management system (not shown in FIG. 2), a high-voltage battery pack 10, a timer power supply module 20, a timer device 30 and a high-voltage power supply module 40, wherein the battery management system includes a main control module 50 and a power conversion module 60.

In the embodiments, the main control module 50 is configured to send a wake-up time that is received to the timer device 30; the timer power supply module 20 is configured to supply power to the timer device 30 according to electric energy in the high-voltage battery pack 10; the high-voltage power supply module 40 is configured to supply power to the power conversion module 60 according to the electric energy in the high-voltage battery pack 10; the timer device 30 is configured to set a wake-up clock according to the wake-up time, start timing when the battery management system enters into sleep, and send a discharge instruction to the high-voltage battery pack 10 when the timing reaches the wake-up time; and the power conversion module 60 is configured to convert high-voltage electric energy, which is output by the high-voltage battery pack 10 according to the discharge instruction, into low-voltage electric energy, and use the low-voltage electric energy to power the battery management system.

In the embodiments, the wake-up time received by the main control module 50 is a wake-up time set by the vehicle control module. The vehicle control module may set the wake-up time and send the wake-up time to the timer device 30 via the main control module 50 of the battery management system. As an example, the main control module 50 may be, for example, a Micro-programmed Control Unit (Micro-programmed Control Unit, MCU).

The system for providing the constant power source according to the embodiments of the present application may periodically wake up the BMS by the timer device, provide a power source for the BMS when the BMS is in sleep, and thus ensure normal operation of the BMS to monitor the status of the vehicle, which may not only reduce energy consumption of the BMS but also avoid the aging problem caused by a circuit control equipment supplying power in a long time and thus extend the life of the BMS.

Figure 3:
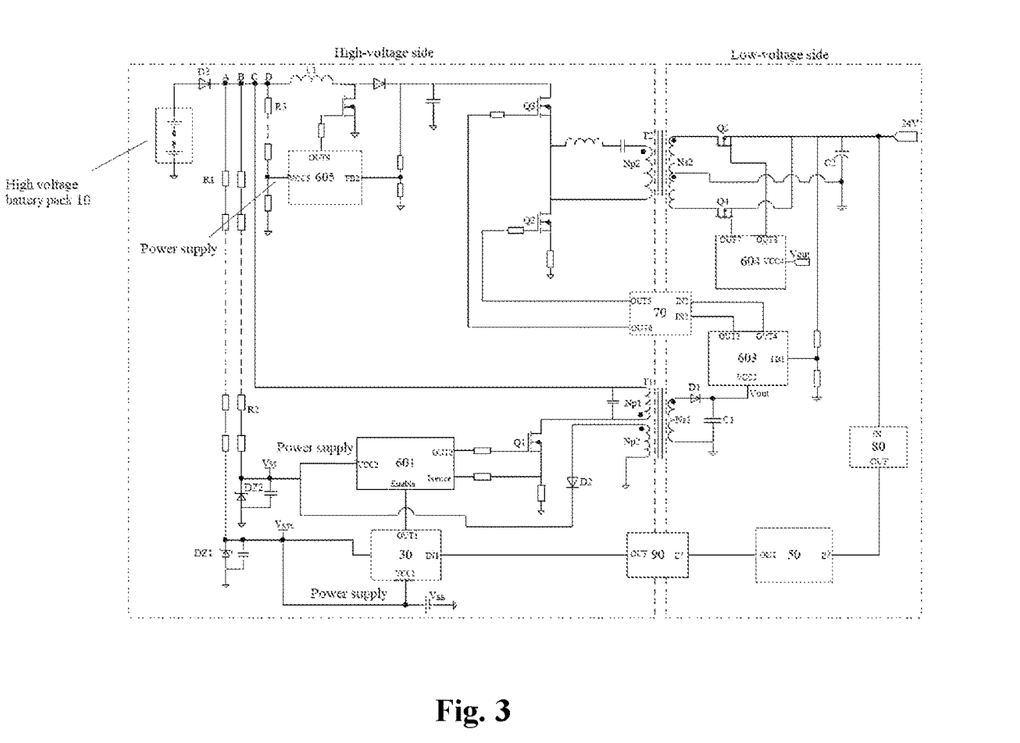
FIG. 3 is a detailed structure diagram showing a system for providing a constant power source according to an exemplary embodiment of the present application.

FIG. 3 is a detailed structure diagram showing a system for providing a constant power source according to an exemplary embodiment of the present application. It should be noted that these embodiments are not intended to limit the scope of the present application.

As shown in FIG. 3, in an embodiment, the power conversion module 60 includes a flyback power control module 601, a first high-voltage transmission module, a resonance control module 603, a synchronous rectifier module 604, a voltage-boost control module 605 and a second high-voltage transmission module.

The timer device 30 is further configured to provide an enable signal to the flyback power control module 601 when the timing reaches the wake-up time, and under the control of the enable signal, the flyback power control module 601 starts to operate.

The flyback power control module 601 is configured to provide a power source for the resonance control module 603 and the synchronous rectifier module 604 via the first high-voltage transmission module.

The resonance control module 603 is configured to control conduction between the voltage-boost control module 605 and the second high-voltage transmission module when detecting that the second high-voltage transmission module outputs a low-voltage power signal.

The voltage-boost control module 605 is configured to perform voltage-boost processing on electric energy provided by the high-voltage battery pack to obtain high-voltage direct-current electric energy.

The second high-voltage transmission module is configured to convert the high-voltage direct-current electric energy into the low-voltage electric energy.

The synchronous rectifier module 604 is configured to perform synchronous rectification processing on the low-voltage electric energy, and use the low-voltage electric energy after the synchronous rectification processing to supply power to the battery management system.

In the embodiments of the present application, when the vehicle needs to be powered off, the vehicle control module may be powered off after setting the wake-up time, generating a timing wake-up instruction according to the wake-up time, and issuing the wake-up instruction the BMS. The BMS issues the timing wake-up instruction to the timer device via the main control module. After the timer has set the wake-up time, the BMS will enter into sleep. When the timing of the timer device reaches the wake-up time, the timer device will issue a discharge command to the high-voltage battery pack. The electric energy in the high-voltage battery pack is converted into the low-voltage electric energy from high-voltage electric energy by the power conversion module to provide the power source for the BMS, so that the BMS is awakened from sleep and starts to monitor the SOC, voltage, current and other related information of the battery pack of the vehicle and handle it accordingly.

As shown in FIG. 3, in the embodiments, the timer power supply module may include a clock power access point A, a first voltage-divider resistor network R1 and a first voltage-stabilizer unit DZ1, and the timer device 30 includes a clock power terminal VCC1.

In the embodiments, the clock power access point A is located at a positive electrode of the high-voltage battery pack. One terminal of the first voltage-divider resistor network R1 is connected to the clock power access point A, and the other terminal of the first voltage-divider resistor network R1 is connected to the clock power terminal VCC1. One terminal of the first voltage-stabilizer unit DZ1 is connected to the other terminal of the first voltage-divider resistor network R1, and the other terminal of the first voltage-stabilizer unit DZ1 is connected to a reference voltage terminal.

In the embodiments, the first voltage-divider resistor network R1 may include a plurality of resistors connected in series, and the first voltage-stabilizer unit DZ1 may include a voltage-stabilizer diode.

In the embodiments, the clock power access point A may provide a constant voltage $V_{RTC}$ to the timer device 30 via the first voltage-divider resistor network R1, and provide a stable operating voltage to the clock power terminal VCC1 of the timer device 30 through voltage-stabilizing by the first voltage-stabilizer unit DZ1.

In the embodiments, the constant voltage may also be provided to the timer device by a backup battery. The timer device according to the embodiments of the present application may maintain continuous operation by means of the constant voltage provided by the timer power supply module or the backup battery, and is not affected by sleeping and stopping operation of the BMS.

Continuing to refer to FIG. 3, in the embodiments, the timer device 30 may include a real-time clock (Real Time Clock, RTC), the clock power terminal VCC1, a clock input terminal IN1 and a clock output terminal OUT1.

The timer device 30 is further configured to receive the wake-up time via the clock input terminal IN1 and set the real-time clock RTC according to the wake-up time.

In this example, the real-time clock RTC starts timing when the battery management system enters into sleep, and provides the enable signal via the clock output terminal when the timing reaches the wake-up time. That is, the clock output terminal OUT1 of the real-time clock enables an enable pin (Enable) of the flyback power control module 601.

As shown in FIG. 3, in the embodiments, the high-voltage power supply module may include a flyback power supply module, a first high-voltage power supply access point C and a voltage-boost control power supply module.

The flyback power supply module is configured to provide a startup voltage to the flyback power control module 601.

The first high-voltage power supply access point C is configured to provide the electric energy in the high-voltage battery pack to the first high-voltage transmission module.

The voltage-boost control power supply module is configured to supply power to the voltage-boost control module according to the electric energy in the high-voltage battery pack.

Continuing to refer to FIG. 3, the flyback power supply module may include a flyback control power access point B, a second voltage-divider resistor network R2 and a second voltage-stabilizer unit DZ2.

The flyback control power access point B is located at the positive electrode of the high-voltage battery pack. One terminal of the second voltage-divider resistor network R2 is connected to the flyback control power access point B, and the other terminal of the second voltage-divider resistor network R2 is connected to a flyback power terminal VCC2 of the flyback power control module 601. One terminal of the second voltage-stabilizer unit DZ2 is connected to the other terminal of the second voltage-divider resistor network R2, and the other terminal of the second voltage-stabilizer unit DZ2 is connected to the reference voltage terminal.

In the embodiments, the flyback power control module 601 may receive the enable signal via the enable terminal "Enable", and use the enable signal to enable the flyback power control module 601 to start to operate.

In the embodiments, the second voltage-divider resistor network R2 may include a plurality of resistors connected in series, and the second voltage-stabilizer unit DZ2 may include a voltage-stabilizer diode.

In the embodiments, the flyback control power access point B provides a constant voltage Vss to the flyback power control module 601 via the second voltage-divider resistor network R2. Through voltage stabilizing by the second voltage-stabilizer unit DZ2, the flyback power terminal VCC2 of the flyback power control module 601 obtains a stable startup voltage.

Continuing to refer to FIG. 3, the voltage-boost control power supply module may include a second high-voltage power supply access point D and a third voltage-divider resistor network R3, and the third voltage-divider resistor network R3 may include a plurality of resistors connected in series.

The second high-voltage power supply access point D is located at the positive electrode of the high voltage battery pack 10. One terminal of the third voltage-divider resistor network R3 is connected to the second high-voltage power supply access point D, and the other terminal of the third voltage-divider resistor network is connected to a voltage-boost control power terminal of the voltage-boost control module.

In the embodiments, the third voltage-divider resistor network R3 may function as a voltage divider. By adjusting the resistance value of the third voltage-divider resistor network R3, the variation range of the operating voltage of the voltage-boost control module may be adjusted to enable the voltage-boost control module to obtain a stable operating voltage.

As shown in FIG. 3, in the embodiments, the first high-voltage transmission module includes a first switch device Q1 and a first transformer T1, and the flyback power control module 601 includes a flyback output terminal OUT2.

In the embodiments, the flyback power control module 601 is further configured to control turn-on and turn-off of the first switch device Q1 by a pulse width modulation signal output from the flyback output terminal OUT2.

When the first switch device Q1 is turned on, a first part Np1 of a primary winding of the first transformer T1 stores energy, and when the first switch device Q1 is turned off, the energy stored in the first part Np1 of the primary winding is coupled to a second part Np2 of to the primary winding and a secondary winding Ns' of the first transformer T1.

In the embodiments, the electric energy coupled to the secondary winding Ns' of the first transformer T1 is used to provide the power source for the resonance control module 603 and the synchronous rectifier module 604, and the electric energy coupled to the second part Np2 of the primary winding of the first transformer T1 is used to provide electric energy for the flyback power control module 601.

In the embodiments, the power conversion module further includes a first rectifier and filter unit, which is connected to a resonance control power terminal VCC3 of the resonance control module 603 and a synchronous rectifier power terminal VCC4 of the synchronous rectifier module 604, respectively.

The first rectifier and filter unit is configured to perform rectification and filter processing on the electric energy coupled to the secondary winding Ns' of the first transformer T1, and input the electric energy after the rectification and filter processing to the resonance control power terminal VCC3 and the synchronous rectifier power terminal VCC4.

As shown in FIG. 3, in the embodiments, the first rectifier and filter unit includes a first rectifier diode network D1 and a first filter capacitor network C1.

An input terminal of the first rectifier diode network D1 is connected to a dotted terminal of the secondary winding of the first transformer T1, an output terminal of the first rectifier diode network D1 is connected to one terminal of the first filter capacitor network C1, and the other terminal of the first filter capacitor network C1 is connected to an un-dotted terminal of the secondary winding of the first transformer T1 and the reference voltage terminal.

In the embodiments, the first rectifier diode network D1 may include a single diode device or two or more diodes connected in series and/or in parallel. The first filter capacitor network C1 may include a single capacitor or more than two capacitors connected a series and/or in parallel. The first rectifier diode network may function as a rectifier and improve current passing capacity, and the first filter capacitor network may function as a filter.

As shown in FIG. 3, in the embodiments, the resonance control module 603 further includes a resonance control power terminal VCC3, a pair of resonance control output ports OUT3 and OUT4, and a low-voltage signal feedback pin FB1.

The system for providing the constant power source further includes a first isolator device 70, which includes a first pair of isolator input ports IN2 and IN3 and a first pair of isolator output ports OUT5 and OUT6.

Continuing to refer to FIG. 3, the second high-voltage transmission module may to include a second transformer T2 and a second pair of switch devices Q2 and Q3.

The resonance control power terminal VCC3 is connected to the output terminal of the first high-voltage transmission module, the pair of resonance control output ports OUT3 and OUT4 is connected to the first pair of isolator input ports IN2 and IN3, the first pair of isolator output ports OUT5 and OUT6 is connected to the second pair of switch devices Q2 and Q3, the second pair of switch devices Q2 and Q3 is connected to the output terminal of the voltage-boost control module 605, and the low-voltage signal feedback pin FB1 is connected to the output terminal of the second high-voltage transmission module.

The resonance control module 603 is configured to start to operate according to the power source provided by the first high-voltage transmission module, and when the low-voltage signal feedback pin FB1 detects that the second high-voltage transmission module outputs a low-voltage power signal, control turn-on of the second pair of switch devices Q2 and Q3 by the first isolator device 70.

The second high-voltage transmission module is configured to convert the high-voltage direct-current electric energy after the voltage-boost processing by the voltage-boost control module 605 into the low-voltage electric energy when the second pair of switch devices Q2 and Q3 is turned on.

In the embodiments, the pair of resonance control output ports includes a first resonance control output terminal OUT3 and a second resonance control output terminal OUT4, the first pair of isolator input ports includes a first isolator input terminal IN2 and a second isolator input terminal IN3, the first pair of isolator output ports includes a first isolator output terminal OUT5 and a second isolator output terminal OUT6, and the second pair of switch devices includes a second switch device Q2 and a third switch device Q3.

The first resonance control output terminal OUT3 is connected to the first isolator input terminal IN2, the second resonance control output terminal OUT4 is connected to the second isolator input terminal IN3, the first isolator output terminal OUT5 is connected to the second switch device Q2, and the second isolator output terminal OUT6 is connected to the third switch device Q3.

In the embodiments, the voltage-boost control module 605 includes a voltage-boost control power terminal VCC5, a voltage-boost control output terminal OUT5 and a high-voltage signal feedback pin FB2.

The voltage-boost control module 605 is further configured to perform the voltage-boost processing on the electric energy provided by the high-voltage battery pack 10 to obtain the high-voltage direct-current electric energy when the high-voltage signal feedback pin FB2 detects the high-voltage power signal output by the high-voltage battery pack.

In the embodiments, the voltage-boost control power supply module includes a second high-voltage power supply access point D and a third voltage-divider resistor network R3.

The second high-voltage power supply access point D is located at the positive electrode of the high-voltage battery pack 10, one terminal of the third voltage-divider resistor network R3 is connected to the second high-voltage power supply access point D, and the other terminal of the third voltage-divider resistor network R3 is connected to the voltage-boost control power terminal VCC5.

In the embodiments, the synchronous rectifier module 604 includes a synchronous rectifier power terminal VCC4 and a pair of synchronous rectifier output ports OUT7 and OUT8, and the second high-voltage transmission module includes a third pair of switch devices Q4 and Q5.

The synchronous rectifier power terminal 604 is connected to the output terminal of the first high-voltage transmission module, and the pair of synchronous rectifier output ports is connected to the third pair of switch devices.

The synchronous rectifier module 604 is further configured to detect the low-voltage electric energy output by the second high-voltage transmission module, control turn-on of the third pair of switch devices when the low-voltage electric energy meets a low-voltage threshold condition, and use the low-voltage electric energy to supply power to the battery management system when the third pair of switch devices is turned on.

In the embodiments, the pair of synchronous rectifier output ports includes a first synchronous rectifier output terminal OUT7 and a second synchronous rectifier output terminal OUT8, and the third pair of switch devices includes a fourth switch device Q4 and a fifth switch device Q5.

A control terminal of the fourth switch device Q4 is connected to the first synchronous rectifier output terminal OUT7, and a first load access terminal of the fourth switch device Q4 is connected to a first terminal of the secondary winding Ns2 of the second transformer T2. As shown in FIG. 3, the first terminal of the secondary winding Ns2 of the second transformer T2 is an un-dotted terminal.

A control terminal of the fifth switch device Q5 is connected to the second synchronous rectifier output terminal OUT5, and a first load access terminal of the fifth switch device Q5 is connected to a second terminal of the secondary winding of the second transformer to T2. As shown in FIG. 3, the second terminal of the secondary winding Ns2 of the second transformer T2 is a dotted terminal.

A second load access terminal of the fifth switch device Q5 is connected to a second load access terminal of the fourth switch device Q4, and a center-tap output terminal of the second transformer T2 is connected to the reference voltage terminal.

In the embodiments, the power conversion module 60 further includes a second rectifier and filter unit, and the second rectifier and filter unit is connected to the output terminal of the second high-voltage transmission module.

The second rectifier and filter unit is configured to perform rectification and filter processing on the low-voltage electric energy after the synchronous rectification processing, and send the low-voltage electric energy after the rectification and filter processing to the battery management system.

In the embodiments, the system for providing the constant power source further includes a second rectifier and filter unit, and the second rectifier and filter unit includes a second filter capacitor network C2. The second filter capacitor network may include a plurality of capacitors connected in parallel, and the plurality of capacitors connected in parallel may have different capacitance values.

As shown in FIG. 3, one terminal of the second filter capacitor network C2 is connected to the second load access terminal of the fifth switch device, and the other terminal of the second filter capacitor network C2 is connected to the reference voltage terminal. In the embodiments, the second filter capacitor network C2 may function as a filter and a stabilizer.

Exemplarily, in the system for providing the constant power source shown in FIG. 3, the first voltage-divider resistor network R1, the second voltage-divider resistor network R2 and the third voltage-divider resistor network R3 may each include a resistor. In other embodiments, the first voltage-divider resistor network R1, the second voltage-divider resistor network R2 and the third voltage-divider resistor network R3 may each include more than two resistors connected in series and/or in parallel.

It should be noted that in actual application scenarios of the system for providing the constant power source, the combination and resistance values of the first voltage-divider resistor network R1, the second voltage-divider resistor network R2 and the third voltage-divider resistor network R3 may be set according to actual situations.

In the embodiments, the system for providing the constant power source further includes a low-dropout linear regulator module 80 and a second isolator device 90.

The low-dropout linear regulator module 80 is configured to perform voltage-reduction processing on the low-voltage electric energy to obtain the electric energy after the voltage-reduction processing.

The main control module 50 is further configured to start to operate according to the electric energy after the voltage-reduction processing, and send the wake-up time to the timer device 30 via the second isolator device 90.

In the embodiments, the low-dropout linear regulator module performs the voltage-reduction processing on the low-voltage electric energy to obtain the operating voltage of the main control module and thus enable the main control module to start to operate. The low-dropout linear regulator module may stabilize the low-voltage electric energy output by the second high-voltage transmission module, so that the output low-voltage electric energy maintains a stable voltage.

As shown in FIG. 3, in the embodiments, an anti-reverse diode network D3 may be included between the high-voltage battery pack 10 and the clock power access point A, the first high-voltage power supply access point C, the flyback control power access point B or the second high-voltage power supply access point D. That is to say, in the embodiments, the electric energy in the high-voltage battery pack is input to the clock power access point A, the flyback control power access point B, the first high-voltage power supply access point C or the second high-voltage power supply access point D through the anti-reverse diode network D3.

In the embodiments, the anti-reverse diode network D3 is connected to the positive electrode of the high-voltage battery pack. When the positive and negative electrodes of the high-voltage battery pack are connected reversely, as can be known from unidirectional conductivity of diodes, the anti-reverse diode network D3 may prevent the current in the high-voltage battery pack from passing through. At this time, the high-voltage battery pack and a load circuit connected to the high-voltage battery pack cannot form a loop, so that the load circuit connected to the high-voltage battery pack is protected from damage.

In the embodiments, the system for providing the constant power source may further include a first buffer circuit module, and the first buffer circuit module may include a first buffer diode network and a first buffer capacitor network. One terminal of the first buffer diode network is connected to the other terminal of the first voltage-divider resistor network R1 and the other terminal of the first buffer diode network is connected to the reference voltage terminal. One terminal of the first buffer capacitor network is connected to the other terminal of the first voltage-divider resistor network R1 and the other terminal of the first buffer capacitor network is connected to the reference voltage terminal.

In the embodiments of the present application, the first buffer circuit module may be configured to suppress voltage oscillation, thereby protecting the stability of the voltage provided by the high-voltage battery pack to the timer device.

In the embodiments, the system for providing the constant power source may further include a second buffer circuit module, and the second buffer circuit module may include a second buffer diode network and a second buffer capacitor network. One terminal of the second buffer diode network is connected to the other terminal of the second voltage-dividing resistor network R2 and the other terminal of the second buffer diode network is connected to the reference voltage terminal. One terminal of the second buffer capacitor network is connected to the other terminal of the second voltage-divider resistor network R2 and the other terminal of the second buffer capacitor network is connected to the reference voltage terminal.

In the system for providing the constant power source shown in FIG. 3, the first rectifier diode network, the first buffer diode network and the second buffer diode network may each include one diode. In other embodiments, the first rectifier diode network, the first buffer diode network and the second buffer diode network may each include more than two diodes connected in series and/or in parallel. In the actual application scenarios of the system for providing the constant power source, the combination of the first buffer diode network or the second buffer diode network may be set according to actual situations.

In the system for providing the constant power source shown in FIG. 3, the first filter capacitor network, the second filter capacitor network, the first buffer capacitor network and the second buffer capacitor network may each include one capacitor. In other embodiments, the first filter capacitor network, the second filter capacitor network, the first buffer capacitor network and the second buffer capacitor network may each include more than two capacitors connected in series and/or in parallel.

It should be noted that in the actual application scenarios of the system for providing the constant power source, the combination of the first buffer capacitor network and the second buffer capacitor network may be set according to actual situations.

In the embodiments of the present application, when the vehicle needs to be powered off, the VCU is powered off after setting the wake-up time and sending the wake-up instruction to the BMS. The BMS issues the wake-up instruction to the timer device via the main control module. The timer sets the real-time clock according to the wake-up instruction and then the BMS enters into sleep. When the timer reaches the preset time, it will provide the enable signal to the enable terminal of the flyback power control module.

Due to the existence of the enable signal, the flyback power control module starts to operate and controls turn-on and turn-off of the switch device Q1, thereby controlling the primary side of the first transformer to store and release energy. That is, when Q1 is turned on, the first part Np1 of the primary winding of the first transformer stores energy; when Q1 is turned off, the energy is coupled to the second part Np2 of the first transformer and the secondary winding Ns1 of the first transformer.

After the electric energy in the secondary winding Ns1 of the first transformer is diode-rectified and capacitor-filtered, the output electric energy provides the power source for the resonance control module and the synchronous rectifier module, and then the resonance control module and the synchronous rectifier module start to operate. A feedback pin of the resonance control module detects a low voltage output from the low-voltage side, for example 24V, and controls the operation of Q2 and Q3 on the high-voltage side by the first isolator device. The electric energy in the Np2 of the first transformer is diode-rectified and then provides the power source for the flyback control module.

The voltage-boost control module on the high-voltage side may perform the voltage-boost processing on the electric energy provided by the high-voltage battery pack. When Q2 and Q3 are turned on, the second transformer outputs stable low-voltage (for example, 24V) electric energy at the low-voltage side based on the electric energy after the voltage-boost processing in the high-voltage battery pack. The low-voltage electric energy is stepped down by the low-dropout linear regulator module and then provides the electric energy to the main control module to enable the main control module to operate normally, so that the BMS operates normally and monitor, store and correspondingly handle data relevant to the battery.

If a vehicle is not provided with a lead-acid battery, the system for providing the constant power source according to the embodiments of the present application wakes up the BMS by the timer device when the BMS is in sleep and provides a stable power source for the BMS to ensure that the BMS is in the powered state and capable of collecting and storing the information relevant to the battery pack of the vehicle, realizing real-time monitoring of the vehicle by the BMS. In the embodiments of the present application, the wake-up of the BMS is realized by the timer device without assistance of the lead-acid battery of the vehicle, thereby reducing the loss of lead-acid in the lead-acid battery and increasing the life of the lead-acid battery.

When the electric vehicle is not used, the BMS may be put into sleep temporarily, and the wake-up time of the BMS may be set according to actual needs. This may not only reduce energy consumption of the BMS, but also avoid the aging problem caused by the circuit control equipment when powering for a long time and thus extend its life.

Figure 4:
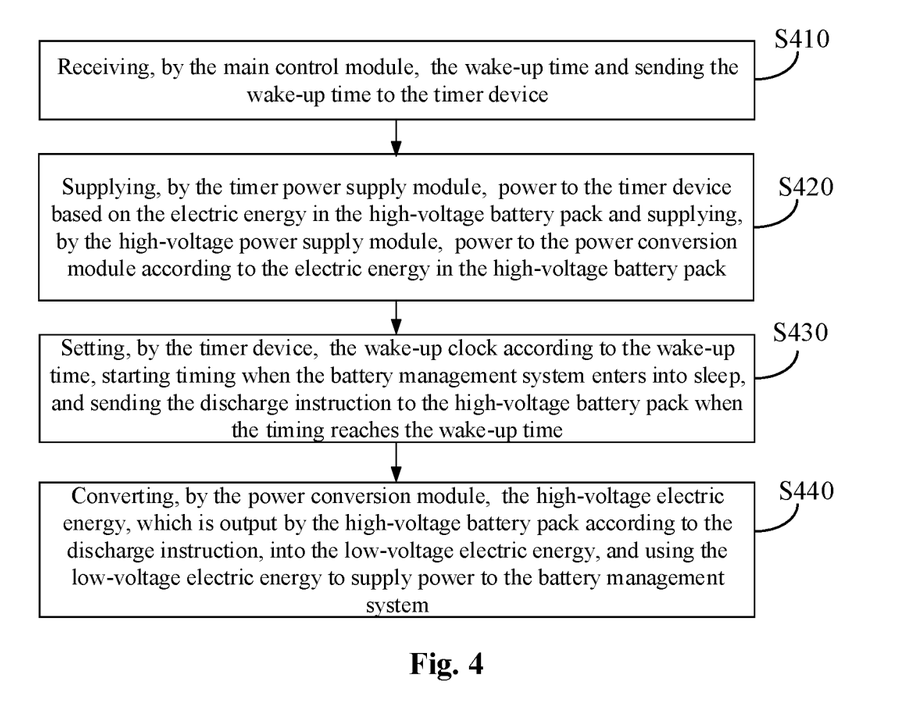
FIG. 4 is a flowchart showing a method for providing a constant power source according to an embodiment of the present application.

FIG. 4 is a flowchart showing a method for providing a constant power source according to an embodiment of the present application. As shown in FIG. 4, in the embodiments, the method for providing a constant power source may be applied to the above-mentioned system for providing a constant power source described in conjunction with FIGS. 1 to 3. The system for providing the constant power source may include a battery management system, a high-voltage battery pack, a timer power supply module, a timer device and a high-voltage power supply module, wherein the battery management system includes a main control module and a power conversion module. In the embodiments, the method 400 for providing a constant power source may include:

step S410, receiving, by the main control module, the wake-up time and sending the wake-up time to the timer device;

step S420, supplying, by the timer power supply module, power to the timer device according to the electric energy in the high-voltage battery pack, and by the high-voltage power supply module, supplying power to the power conversion module according to the electric energy in the high-voltage battery pack;

step S430, setting, by the timer device, the wake-up clock according to the wake-up time, starting timing when the battery management system enters into sleep, and sending the discharge instruction to the high-voltage battery pack when the timing reaches the wake-up time; and step S440, converting, by the power conversion module, the high-voltage electric energy, which is output by the high-voltage battery pack according to the discharge instruction, into the low-voltage electric energy, and using the low-voltage electric energy to supply power to the battery management system.

In the embodiments, the wake-up time received by the main control module in step S410 is the wake-up time set by the vehicle control module. In the embodiment, the vehicle control module may set the wake-up time and send the wake-up time to the timer device via the main control module.

In the embodiments, after the step of setting, by the vehicle control module, the wake-up time and sending the wake-up time to the timer device via the main control module, the method 400 for providing a constant power source may further include:

powering off the vehicle control module, and after the wake-up time is sent to the timer device via the main control module, powering off the battery management system.

In the embodiments, the method 400 for providing a constant power source may further include: after receiving, by the main control module, the wake-up time and sending the wake-up moment to the timer device, powering off the battery management system.

In the embodiments, the method 400 for providing a constant power source further includes:

step S450, when the timing of the timer device does not reach the wake-up time and the vehicle control module is in operation, providing, by the vehicle control module, the operating voltage to the high-voltage battery pack to enable the high-voltage battery pack to start to operate.

In the embodiments, the method 400 for providing a constant power source further includes:

step S460, when the timing of the timer device reaches the wake-up time and the vehicle control module is in sleep, resetting, by the timer device, the wake-up clock according to the wake-up time.

In the embodiments of the present application, during the period when the timer times, when the vehicle control module starts to operate, the BMS wakes up from sleep, and when the vehicle control module is not operating, the timer continues to time. After the BMS is awakened from sleep, if the vehicle control module is still not operating, the BMS will enter into sleep after sending the wake-up instruction to the timer and wait for the next wake-up. Once the VCU is found to start operating, the sleep-awakened state ends.

Figure 5:
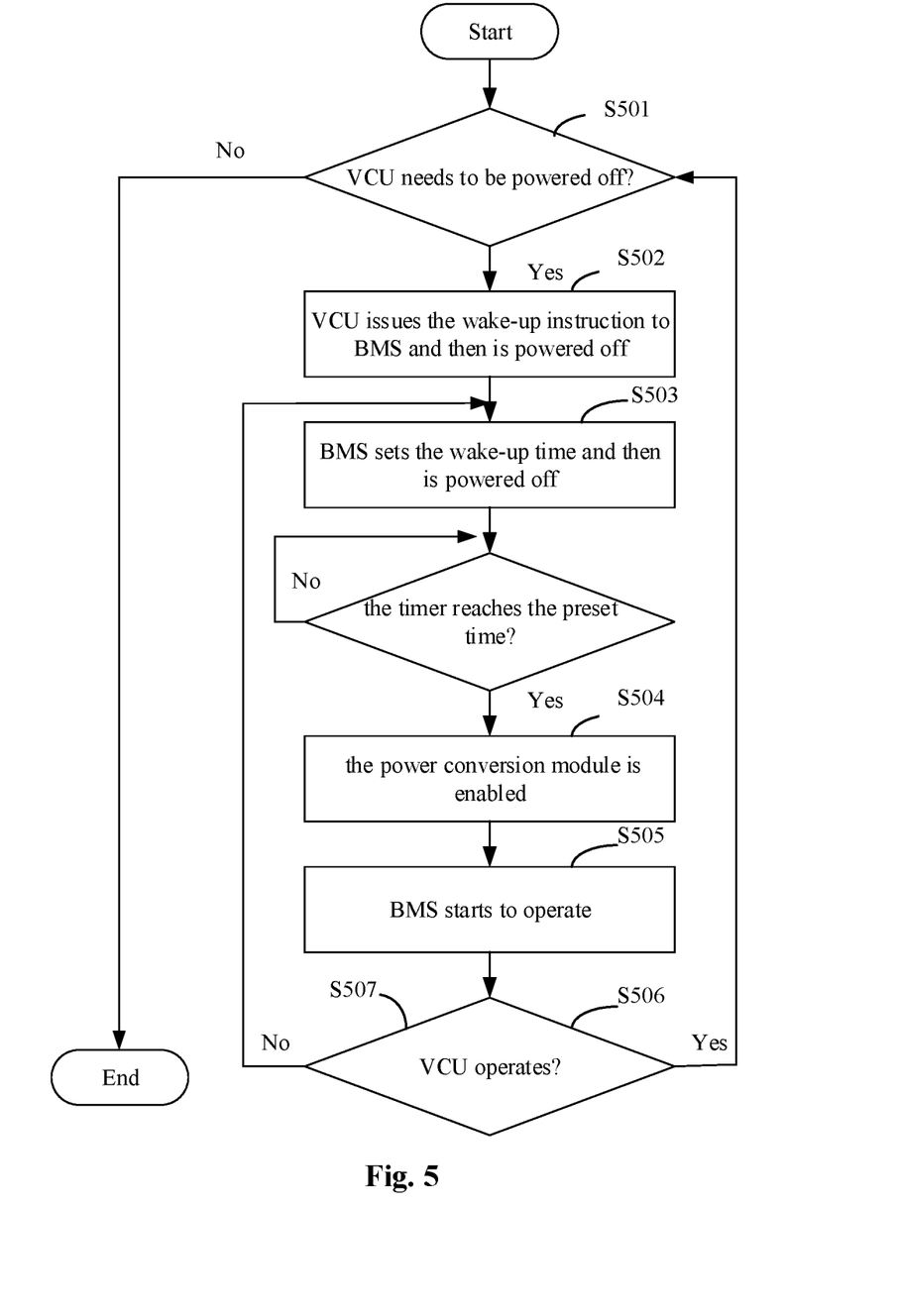
FIG. 5 is a flowchart showing a method for providing a constant power source according to another embodiment of the present application.

FIG. 5 illustrates a flowchart of a method for providing a constant power source according to another embodiment of the present application. As shown in FIG. 5, in the embodiments, the method for providing a constant power source may include the steps as described below.

As shown in step S501, the vehicle control module determines whether it needs to be powered off when operating normally.

As shown in step S502, if it needs to be powered off, the vehicle control module is powered off after issuing the timing wake-up instruction to the BMS; if it does not need to be powered off, the VCU operates normally, and the method for providing a constant power source ends.

As shown in step S503, the BMS sends the timing wake-up instruction to the timer to device to enable the timer device to set the wake-up clock according to the wake-up time, and then the BMS is powered off and in sleep.

As shown in step S504, when the timing of the timer device reaches the wake-up time that is predetermined, the power conversion module is enabled to operate by the timer device.

In this step, the step of enabling the power conversion module to operate by the timer device may specifically include sending the enable signal to a forward power control module when the timer reaches the wake-up time. Under control of the enable signal, the forward power control module starts to operate; the forward power control module controls turn-on and turn-off of the switch device Q1, and thus controls the storage and release of the electric energy in the primary winding Np1 of the transformer T1. The forward power control module further controls turn-on and turn-off of the switch device Q2 and the switch device Q3. When the switch device Q3 is turned on, the high-voltage electric energy output by the high-voltage battery pack is converted into the low-voltage electric energy by the transformer T2.

As shown in step S505, the high-voltage electric energy output by the high-voltage battery pack is converted into the stable low-voltage electric energy by the power conversion module, and then the BMS operates normally.

As shown in step S506, it is determined whether the vehicle control module operates normally. If the vehicle control module operates normally, the BMS will not enter into sleep after completing normal operation.

As shown in step S507, if the vehicle control module does not operate normally, that is, the vehicle control module is still in sleep, then after the BMS completes the normal operation, the timer device resets the wake-up clock according to the wake-up time, and the BMS is powered off again and thus in sleep.

The method for providing a constant power source according to the embodiments of the present application, wakes up the BMS by the timer device when the BMS is in sleep, and provide a stable power source for the BMS by the high-voltage battery pack to ensure that the BMS is in the powered state and capable of monitoring the status of the vehicle in real-time. The BMS is awakened without assistance of the vehicle lead-acid battery, thereby the loss of lead-acid in the lead-acid battery is reduced and the life of the lead-acid battery is increased.

It should be clear that the present application is not limited to the specific configuration and processing described in the above embodiments and shown in the drawings. For the convenience and brevity of description, detailed description of known methods are omitted herein, and reference may be made to the specific operating processes of the aforementioned systems, modules and units for corresponding processes in the method embodiments described above, which will not be repeated here.

According to the embodiments of the present application, the processes described above with reference to the flowcharts may be implemented as a computer software program. For example, the embodiments of the present application include a computer program product, which includes a computer program tangibly contained on a machine-readable medium, and the computer program includes program codes for implementing the methods shown in the flowcharts. In such embodiments, the computer program may be downloaded and installed from a network, and/or installed from a removable storage medium.

The above-mentioned embodiments may be implemented in whole or in part by software, hardware, firmware, or any combination thereof. When implemented by software, the embodiments may be implemented in the form of a computer program product in whole or in part. The computer program product includes one or more computer instructions, which when executed on a computer, cause the computer to implement the methods described in the foregoing various embodiments. When the computer program instructions are loaded and executed on the computer, all or part of the processes or functions described in the embodiments of the present application are generated. The computer may be a general-purpose computer, a dedicated computer, a computer network, or other programmable devices. The computer instructions may be stored in a computer-readable storage medium or transmitted from a computer-readable storage medium to another computer-readable storage medium. For example, the computer instructions may be transmitted from a website, computer, server, or data center to another website, computer, server or data center via wired media (such as coaxial cable, optical fiber, digital subscriber line (DSL)) or wireless media (such as infrared, wireless, microwave, etc.). The computer-readable storage medium may be any available medium that can be accessed by the computer or a data storage device such as a server or data center integrated with one or more available media. The applicable media may be magnetic media (for example, a floppy disk, a hard disk, and a magnetic tape), optical media (for example, a DVD), or semiconductor media (for example, a solid state hard disk).

The device embodiments described above are merely illustrative. The units described as separate components may or may not be physically separated, and the components displayed as units may or may not be physical units, that is, they may be located at a same place or may be distributed to multiple network units. Some or all of the modules may be selected according to actual needs to achieve the objectives of the embodiments. Those ordinary skill in the art may understand and implement the embodiments without creative work.

Finally, it should be noted that the above embodiments are merely used to illustrate rather than limit the technical solutions of the present application. Although the present application is described in detail with reference to the foregoing embodiments, those ordinary skill in the art should understand that it is still possible to modify the technical solutions described in the foregoing embodiments, or equivalently replace some or all of the technical features, and these modifications or replacements do not cause the essence of corresponding technical solutions to deviate from the ranges of the technical solutions of various embodiments of the present application.

What is claimed is:

1. A system for providing a constant power source, comprising a battery management system, a high-voltage battery pack, a timer power supply module, a timer device and a high-voltage power supply module, wherein the battery management system comprises a main control module and a power conversion module, and wherein
   the main control module is configured to receive a wake-up time and send the wake-up time to the timer device,
   the timer power supply module is configured to supply power to the timer device according to electric energy in the high-voltage battery pack,
   the high-voltage power supply module is configured to supply power to the power conversion module according to the electric energy in the high-voltage battery pack,
   the timer device is configured to set a wake-up clock according to the wake-up time, start timing when the battery management system enters into sleep mode, and send a discharge instruction to the high-voltage battery pack when the timing reaches the wake-up time, and
   the power conversion module is configured to convert high-voltage electric energy, which is output by the high-voltage battery pack according to the discharge instruction, into low-voltage electric energy, and use the low-voltage electric energy to supply power to the battery management system.

2. The system according to claim 1, wherein the power conversion module comprises a flyback power control module, a first high-voltage transmission module, a resonance control module, a synchronous rectifier module, a voltage-boost control module and a second high-voltage transmission module, and wherein
   the timer device is further configured to provide an enable signal to the flyback power control module when the timing reaches the wake-up time, wherein the flyback power control module starts to operate under control of the enable signal,
   the flyback power control module is configured to provide a power source for the resonance control module and the synchronous rectifier module via the first high-voltage transmission module,
   the resonance control module is configured to control conduction between the voltage-boost control module and the second high-voltage transmission module when detecting that the second high-voltage transmission module outputs a low-voltage power signal,
   the voltage-boost control module is configured to perform voltage-boost processing on the electric energy provided by the high-voltage battery pack to obtain high-voltage direct-current electric energy,
   the second high-voltage transmission module is configured to convert the high-voltage direct-current electric energy into the low-voltage electric energy, and
   the synchronous rectifier module is configured to perform synchronous rectification processing on the low-voltage electric energy, and use the low-voltage electric energy after the synchronous rectification processing to supply power to the battery management system.

3. The system according to claim 2, wherein the timer power supply module comprises a clock power access point, a first voltage-divider resistor network and a first voltage-stabilizer unit, and the timer device comprises a clock power terminal, and wherein
   the clock power access point is located at a positive electrode of the high-voltage battery pack, one terminal of the first voltage-divider resistor network is connected to the clock power access point and the other terminal of the first voltage-divider resistor network is connected to the clock power terminal, one terminal of the first voltage-stabilizer unit is connected to the other terminal of the first voltage-divider resistor network and the other terminal of the first voltage-stabilizer unit is connected to a reference voltage terminal.

4. The system according to claim 2, wherein the timer device comprises a real-time clock, a clock power terminal, a clock input terminal and a clock output terminal, and wherein
   the timer device is further configured to receive the wake-up time via the clock input terminal, and set the real-time clock according to the wake-up time, and
   the real-time clock starts timing when the battery management system enters into sleep, and outputs the enable signal via the clock output terminal when the timing reaches the wake-up time.

5. The system according to claim 2, wherein the high-voltage power supply module comprises a flyback power supply module, a first high-voltage power supply access point and a voltage-boost control power supply module, and wherein the flyback power supply module is configured to supply power to the flyback power control module according to the electric energy in the high-voltage battery pack, the first high-voltage power supply access point is configured to provide the electric energy in the high-voltage battery pack to the first high-voltage transmission module, and the voltage-boost control power supply module is configured to supply power to the voltage-boost control module according to the electric energy in the high-voltage battery pack.

6. The system according to claim 5, wherein the flyback power supply module comprises a flyback control power access point, a second voltage-divider resistor network and a second voltage-stabilizer unit, the flyback power control module comprises an enable terminal and a flyback power terminal, one terminal of the second voltage-stabilizer unit is connected to the other terminal of the second voltage-divider resistor network, and the other terminal of the second voltage-stabilizer unit is connected to a reference voltage terminal, and wherein the flyback control power access point is located at a positive electrode of the high-voltage battery pack, one terminal of the second voltage-divider resistor network is connected to the flyback control power access point, and the other terminal of the second voltage-divider resistor network is connected to the flyback power terminal, and the flyback power control module is further configured to receive the enable signal via the enable terminal so as to use the enable signal to enable the flyback power control module to start to operate.

7. The system according to claim 2, wherein the first high-voltage transmission module comprises a first switch device and a first transformer, and the flyback power control module comprises a flyback output terminal, and wherein the flyback power control module is further configured to control turn-on and turn-off of the first switch device by a pulse width modulation signal output from the flyback output terminal, when the first switch device is turned on, a first part of a primary winding of the first transformer stores electric energy, and when the first switch device is turned off, the electric energy stored in the first part of the primary winding is coupled to a second part of the primary winding and a secondary winding of the first transformer, electric energy coupled to the secondary winding of the first transformer is used to provide the power source for the resonance control module and the synchronous rectifier module, and the electric energy coupled to the second part of the primary winding of the first transformer is used to provide electric energy to the flyback power control module.

8. The system according to claim 7, wherein the power conversion module further comprises a first rectifier and filter unit connected to a resonance control power terminal of the resonance control module and a synchronous rectifier power terminal of the synchronous rectifier module, respectively, and wherein the first rectifier and filter unit is configured to perform rectification and filter processing on the electric energy coupled to the secondary winding of the first transformer and input the electric energy after the rectification and filter processing to the resonance control power terminal and the synchronous rectifier power terminal.

9. The system according to claim 8, wherein the first rectifier and filter unit comprises a first rectifier diode network and a first filter capacitor network, and wherein an input terminal of the first rectifier diode network is connected to a dotted terminal of the secondary winding of the first transformer, an output terminal of the first rectifier diode network is connected to one terminal of the first filter capacitor network, and the other terminal of the first filter capacitor network is connected to an un-dotted terminal of the secondary winding of the first transformer and a reference voltage terminal.

10. The system according to claim 2, wherein the resonance control module further comprises a resonance control power terminal, a pair of resonance control output ports and a low-voltage signal feedback pin, the system for providing the constant power source further comprises a first isolator device comprising a first pair of isolator input ports and a first pair of isolator output ports, and the second high-voltage transmission module comprises a second transformer and a second pair of switch devices, and wherein the resonance control power terminal is connected to an output terminal of the first high-voltage transmission module, the pair of resonance control output ports is connected to the first pair of isolator input ports, the first pair of isolator output ports is connected to the second pair of switch devices, the second pair of switch devices is connected to an output terminal of the voltage-boost control module, and the low-voltage signal feedback pin is connected to an output terminal of the second high-voltage transmission module, and wherein the resonance control module is configured to start to operate according to the power source provided by the first high-voltage transmission module, and when the low-voltage signal feedback pin detects that the second high-voltage transmission module outputs the low-voltage power signal, control turn-on of the second pair of switch devices via the first isolator device, and the second high-voltage transmission module is configured to convert the high-voltage direct-current electric energy after the voltage-boost processing by the voltage-boost control module into the low-voltage electric energy when the second pair of switch devices is turned on.

11. The system according to claim 10, wherein the pair of resonance control output ports comprises a first resonance control output terminal and a second resonance control output terminal, the first pair of isolator input ports comprises a first isolator input terminal and a second isolator input terminal, the first pair of isolator output ports comprises a first isolator output terminal and a second isolator output terminal, and the second pair of switch devices comprises a second switch device and a third switch device, and wherein the first resonance control output terminal is connected to the first isolator input terminal, the second resonance control output terminal is connected to the second isolator input terminal, the first isolator output terminal is connected to the second switch device, and the second isolator output terminal is connected to the third switch device.

12. The system according to claim 2, wherein the voltage-boost control module comprises a voltage-boost control power terminal, a voltage-boost control output terminal and a high-voltage signal feedback pin, and wherein
the voltage-boost control module is further configured to, when the high-voltage signal feedback pin detects a high-voltage power signal output from the high-voltage battery pack, perform the voltage-boost processing on the electric energy provided by the high-voltage battery pack via the voltage-boost control output terminal to obtain the high-voltage direct-current electric energy.

13. The system according to claim 5, wherein the voltage-boost control power supply module comprises a second high-voltage power supply access point and a third voltage-divider resistor network, and wherein
the second high-voltage power supply access point is located at a positive electrode of the high-voltage battery pack, one terminal of the third voltage-divider resistor network is connected to the second high-voltage power supply access point, and the other terminal of the third voltage-divider resistor network is connected to a voltage-boost control power terminal of the voltage-boost control module.

14. The system according to claim 2, wherein the synchronous rectifier module comprises a synchronous rectifier power terminal and a pair of synchronous rectifier output ports, and the second high-voltage transmission module comprises a third pair of switch devices, and wherein
the synchronous rectifier power terminal is connected to an output terminal of the first high-voltage transmission module, and the pair of synchronous rectifier output ports is connected to the third pair of switch devices, and
the synchronous rectifier module is further configured to detect the low-voltage electric energy output by the second high-voltage transmission module, control turn-on of the third pair of switch devices when the low-voltage electric energy meets a low-voltage threshold condition, and use the low-voltage electric energy to supply power to the battery management system when the third pair of switch devices is turned on.

15. The system according to claim 14, wherein the pair of synchronous rectifier output ports comprises a first synchronous rectifier output terminal and a second synchronous rectifier output terminal, the third pair of switch devices comprises a fourth switch device and a fifth switch device, and the second high-voltage transmission module comprises a second transformer, and wherein
a control terminal of the fourth switch device is connected to the first synchronous rectifier output terminal, and a first load access terminal of the fourth switch device is connected to an un-dotted terminal of a first part of a secondary winding of the second transformer,
a control terminal of the fifth switch device is connected to the second synchronous rectifier output terminal, and a first load access terminal of the fifth switch device is connected to a dotted terminal of a second part of the secondary winding of the second transformer, and a second load access terminal of the fifth switch device is connected to a second load access terminal of the fourth switch device, and a dotted terminal of the first part of the secondary winding of the second transformer is connected to an un-dotted terminal of the second part of the secondary winding of the second transformer.

16. The system according to claim 2, wherein the power conversion module further comprises a second rectifier and filter unit connected to an output terminal of the second high-voltage transmission module, and wherein
the second rectifier and filter unit is configured to perform rectification and filter processing on the low-voltage electric energy after the synchronous rectification processing and transmit the low-voltage electric energy after the rectification and filter processing to the battery management system.

17. The system according to claim 15, further comprising a second rectifier and filter unit comprising a second filter capacitor network, wherein
one terminal of the second filter capacitor network is connected to a second load access terminal of the fifth switch device and the other terminal of the second filter capacitor network is connected to a reference voltage terminal.

18. The system according to claim 1, further comprising a low-dropout linear regulator module and a second isolator device, wherein
the low-dropout linear regulator module is configured to perform voltage-reduction processing on the low-voltage electric energy to obtain the electric energy after the voltage-reduction processing, and
the main control module is further configured to start to operate according to the electric energy after the voltage-reduction processing and send the wake-up time to the timer device via the second isolator device.

19. A method for providing a constant power source, wherein the method is applied to the system for providing the constant power source according to claim 1 and comprises:
receiving, by the main control module, the wake-up time and sending the wake-up time to the timer device;
supplying, by the timer power supply module, power to the timer device according to the electric energy in the high-voltage battery pack, and supplying, by the high-voltage power supply module, power to the power conversion module according to the electric energy in the high-voltage battery pack;
setting, by the timer device, the wake-up clock according to the wake-up time, starting timing when the battery management system enters into sleep mode, and sending the discharge instruction to the high-voltage battery pack when the timing reaches the wake-up time; and
converting, by the power conversion module, the high-voltage electric energy, which is output by the high-voltage battery pack according to the discharge instruction, into the low-voltage electric energy, and using the low-voltage electric energy to supply power to the battery management system.

20. The method according to claim 19, further comprising:
after receiving, by the main control module, the wake-up time and sending the wake-up time to the timer device, powering off the battery management system.

* * * * *